Oct. 27, 1953
L. J. WEBER
2,656,941
PEBBLE FEEDER
Filed Oct. 11, 1948
2 Sheets-Sheet 1
FIG. 1
FIG. 3
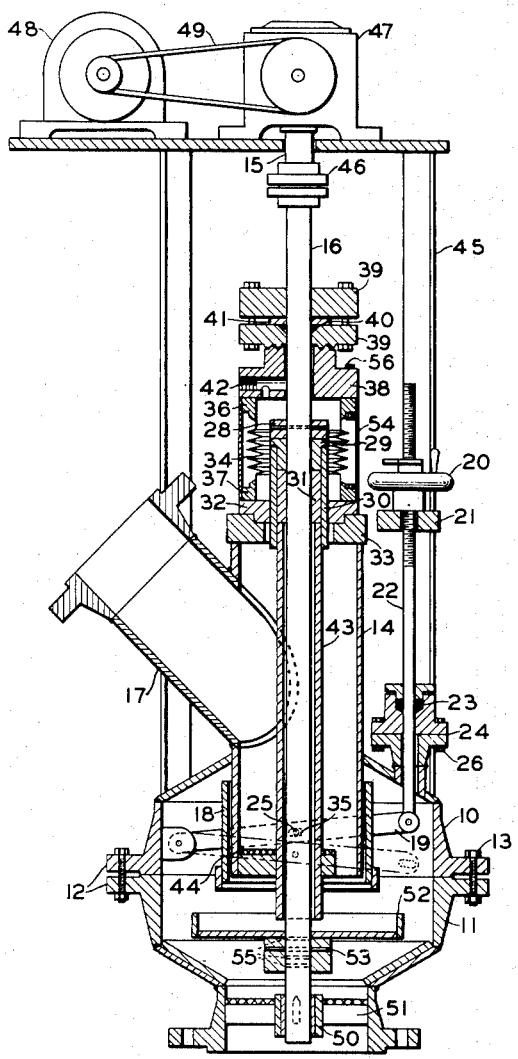
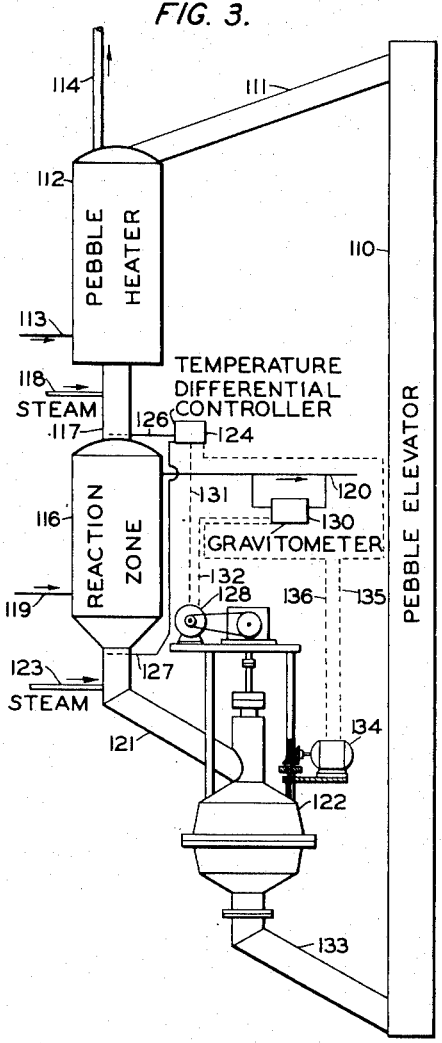
INVENTOR.
L. J. WEBER
BY *Kudson & Young*
ATTORNEYS

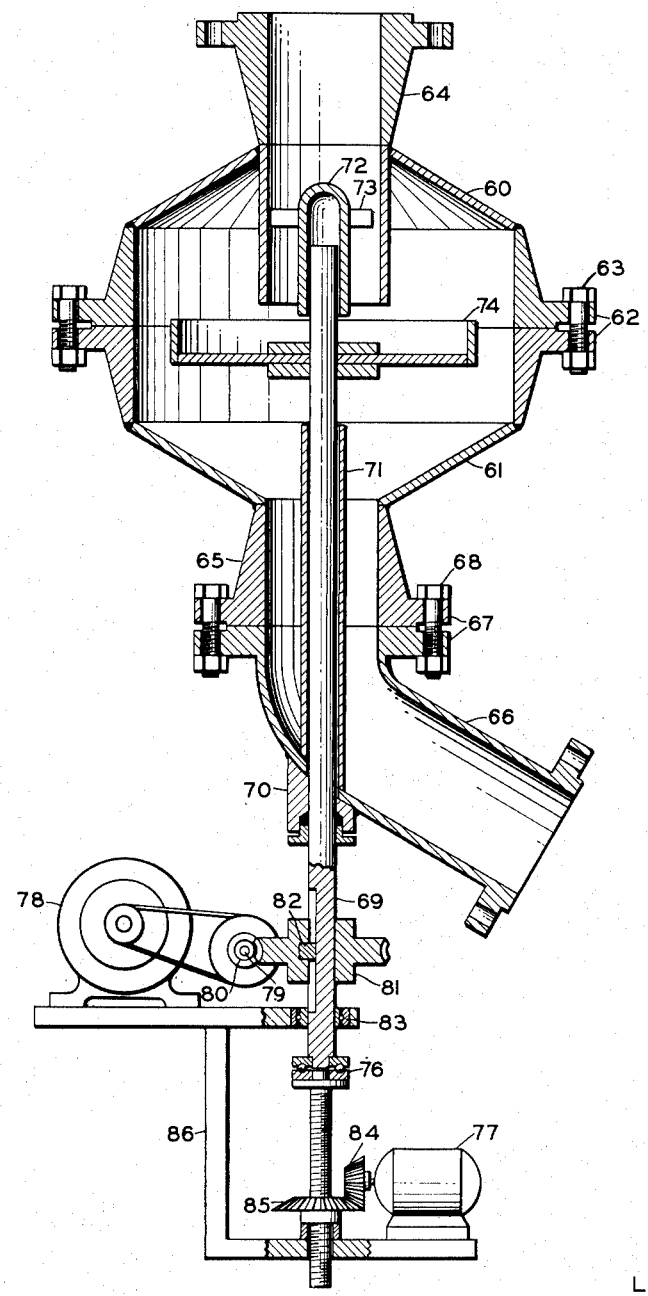

UNITED STATES PATENT OFFICE 2,656,941

PEBBLE FEEDER

Louis J. Weber, Bartlesville, Okla., assignor to Phillips Petroleum Company, a corporation of Delaware Application October 11, 1948, Serial No. 53,875

1 Claim. (Cl. 214—35)

This invention relates to a process and apparatus for controlling the rate of flow of pebbles through a pebble heating apparatus. In one of its more specific aspects, it relates to an apparatus for controlling the rate of flow of heated pebbles through a pebble heating apparatus and cooperating reaction zone. Said invention is a continuation-in-part of my copending applications Serial Numbers 34,316 and 34,317 filed June 21, 1948, now U. S. Patents 2,544,575 and 2,544,576 respectively of March 6, 1951.

A relatively new type of apparatus for supplying heat for processes such as the manufacture of carbon monoxide-hydrogen synthesis gas, cracking of hydrocarbons, and super-heating of steam, is the pebble heater. This particular apparatus is constructed in such a manner that temperatures as high as 3500° F. may be obtained. Generally, such apparatus is constructed primarily of refractory bricks contained within an outer metal shell. The construction is such that a contiguous mass of pebbles may be passed downwardly countercurrent to the flow of hot gases and thereby heating the pebbles. In cracking organic materials at elevated temperatures, pebbles used to transmit the heat imparted to them from the hot gases must necessarily be of highly refractory character and ruggedness, because of the great stress imposed on them by rapid heating and cooling. In conducting endothermic reactions at elevated temperatures, it is necessary to operate with pebbles having in addition to the above characteristics, a relatively high specific heat in order to introduce sufficient heat with a minimum flow of pebbles.

Pebbles which have been heated in a pebble heater as described above are passed therefrom to a suitable reaction zone where they may contact, for example, gases or vapors to be thermally cracked or where they may act as catalyst and heat transfer means for many other reactions. In all cases of such reactions, it is very desirable, if not necessary, to control the rate of flow of pebbles through the reaction zone so that the correct amount of heat is supplied.

An object of my invention is to provide an apparatus for regulating a flow of heated pebbles by the speed at which the apparatus is operated.

Another object of my invention is to provide an apparatus for periodically regulating the flow rate of pebbles through a pebble heating apparatus and cooperating reaction zone.

Another object of my invention is to provide an apparatus for continuously regulating the flow of pebbles through a pebble heater and a co-operating reaction zone.

Another object of my invention is to provide an apparatus whereby the temperature of a reaction zone may be controlled by the rate of flow of heated pebbles therethrough.

Another object is to provide an apparatus whereby the temperature of a reaction zone may be regulated by the rate of flow of pebbles therethrough, the flow of said pebbles being controlled in response to such means as effluent, specific gravity, temperature, etc.

Another object is to provide an apparatus whereby the depth of conversion or extent of reaction may be regulated by the flow of pebbles, the flow of said pebbles being controlled by such means as the specific gravity of the reaction effluent, temperature differential thru the reaction zone, etc.

Another object of this invention is to provide a process for controlling the flow rate of pebbles thru a pebble heating apparatus and co-operating heat transfer zone.

Further objects and advantages of my invention will be apparent to one skilled in the art from the following disclosure and discussion.

I have invented an improved apparatus and process for controlling the rate of flow of pebbles through a pebble heating apparatus and through a reaction chamber or heat transfer zone integral therewith. In particular, my invention pertains to a pebble flow controller, or as it is known in the art, a pebble feeder which comprises an apparatus through which pebbles are flowed at an angle from the vertical to cause their passage at a rate less than free fall, which angle is varied by varying the distance from the bottom of the pebble inlet and the portion of the feeder from which the pebbles are dropped downwardly into an exit means, and by the speed at which the feeder is operated.

Actuating means for controlling the speed of the apparatus of my invention may be of several different types. One very satisfactory method is to utilize a gravitometer in the effluent stream from the reaction chamber. If insufficient heat is present, for example in a cracking process, and the gravity of the effluent is too high, an electrical relay connected with the gravitometer may activate the power means for the pebble feeder, increasing its speed and thereby the flow rate of the pebbles and the heat input to the reaction zone. Obviously the reverse of this may also be carried out. Another method is to utilize a pyrometer in either the reaction zone or the pebble heater whereby a variation of temperature in the particular zone is observed and the power unit for the feeder is either speeded up or slowed down depending on whether the temperature must be raised or lowered. Any of the various types of pyrometer, such as optical, radiation, resistance, electrical, or mechanical, used in conjunction with a suitable electrical circuit for varying the speed of the feeder will work quite well. Other methods such as the temperature differential of the pebbles at the inlet and outlet of the reaction zone may also be used as a means for governing the speed of the pebble feeder.

The following general discussion is given so that the many problems related to the control of a pebble heating apparatus and cooperating reaction zone may be visualized more clearly. Specifically the discussion will include the cracking of hydrocarbons, but other processes such as catalytic treatment of hydrocarbon materials, super-heating of steam, and the like have similar problems.

The first control means to be discussed is a gravitometer which measures the specific gravity of the effluent stream from the pebble heater reaction zone. The gravitometer is preset to the gravity desired and when a fluctuation from this predetermined value occurs, responds so as to correct the deviation. The response may be an adjustment of the pressure of a pneumatic control fluid or the variation or initiation of the current in an electrical circuit. A number of adjustments may be made, some of which are shown in Figure 3. In this drawing, the control action of the gravitometer positions a rheostat, not shown, which varies the voltage to a variable speed electric motor or positions a motor valve which controls the flow of steam to a turbine when either of such means is used for supplying power to the feeder. By so doing the speed of the feeder is regulated thus varying the rate of flow of pebbles and concomitantly the heat input to the reaction zone. By so regulating the heat input to the reaction zone, the specific gravity of the effluent may also be controlled.

Another method for maintaining the gravity at the desired figure is to vary the amount of reactant to the reaction zone. Thus, if the specific gravity of the reaction effluent becomes too high, which would indicate less cracking than desired, the flow rate of reactant fluids may be reduced thereby allowing a greater residence time for the reactants within the reaction zone. By this means more cracking is obtained. Conversely, of course, if the specific gravity is too low, the flow rate of the reactants may be increased thus reducing the residence time and thereby increasing the specific gravity of the effluent. It is quite often preferable to maintain the flow rate of the reactants constant and to control the flow rate of the pebbles instead. If the rate of flow of reactants is changed it will affect the separation and fractionation equipment by which the effluent products are recovered, and many times this will be undesirable. Still another method of control using the gravitometer, is to have this instrument control a motor valve in the fuel line to the pebble heater. When the effluent specific gravity is too high more fuel may be introduced to the heater thus heating the pebbles to a higher temperature and thereby causing more heat to be introduced to the reaction zone and concomitantly more cracking of the reactants. A control system may be provided which incorporates any one of the above methods for maintaining the desired specific gravity of the effluent, or a combination of same may be used.

The gravitometer, though it can maintain an effluent stream of the desired specific gravity, may not always provide a process which is economical from the standpoint of thermal efficiency. For example, the pebbles may not transfer to the reactant gases all the heat that they should, arriving at the bottom of the chamber at too high a temperature. To correct this, or preferably prevent it, use is made of a temperature differential controller which measures the temperature differential between the pebbles at the top of the reaction zone and at the bottom thereof and which may provide any one or a combination of three control effects. The flow rate of the reactant gases through the reaction zone may be increased, the flow rate at which the pebbles are passing through the chamber may be reduced, or the temperature to which the pebbles are heated may be decreased.

Using a temperature measuring device, such as a thermocouple in conjunction with a temperature controller, in the flue gas from the pebble heater is still another means for controlling conditions within the system and obtaining maximum economy. For example, too much fuel may be introduced to the pebble heater thus raising the temperature beyond that needed and/or releasing an amount of heat in excess of that which can be absorbed by the volume of pebbles passing therethrough at a particular rate. The result of this is a waste of heat, said heat passing out the stack. To remedy such a condition, a temperature recording and controlling device may be used which, when an excessively high stack temperature is reached, may actuate a control means in the fuel line to the heater thus reducing the volume of fuel introduced, or may actuate the power means for the feeder, thus controlling the rate of flow of pebbles through the heater. Obviously, with all these control means set in operation, there may easily be overlapping of control or one control counteracting the other. If an attempt is made to control a number of related or dependent variables in any one system by a number of independent automatic control instruments the usual result is that over all control is very unsatisfactory because of hunting, cycling, etc. on the part of various instruments. Therefore it will generally be more desirable to integrate the system so that controllers are interrelated in response. This may be done by having one instrument set or override another. One skilled in the art of instrumentation will readily appreciate that the control system must be planned and adapted for the specific circumstances surrounding such installation.

A further understanding of my invention may be had by referring to the attached drawings in conjunction with the following discussion. These attached drawings and the discussions thereof will also serve to exemplify my invention. Figure 1 is a vertical cross section of a preferred embodiment of my invention. Figure 2 is a vertical cross sectional view of a second embodiment of my invention. Figure 3 is a flow diagram showing the incorporation of a pebble feeder of my invention with a pebble heater and reaction chamber.

Refer now to Figure 1. Number 10 indicates the upper portion of the feeder housing which is attached to the lower portion 11 at flanges 12 by bolts 13. Said feeder housing is constructed to be gas tight and pressure resistant. Number 14 indicates a vertical cylinder extending through the center of portion 10 of the feeder housing and attached thereto. This vertical cylinder acts as a support means for shaft 16 extending therethrough, and as a conduit for pebbles introduced to same by diagonally positioned conduit 17. Sleeve 18, the lower end of which is protected with stellite to prevent wear, may be adjusted vertically with relation to the lower end of vertical cylinder 14 by means of adjustment lever 19, the stationary end of which is attached to the inner wall of upper portion of feeder housing 10 in such a manner that the lever may be raised or lowered to a limited degree, said point of attachment acting as a fulcrum. Lever 19 is attached to sleeve 18 by means of a pin 25 attached to the sleeve, said pin reposing in slot 35 in the lever. External means for adjusting the position of lever 19 is supplied by hand screw 20 supported by bracket 21, operating on vertical shaft 22 which extends downwardly through the upper portion 10 of the feeder housing. Shaft 22 operates through a gas-tight seal supplied by stuffing box 23 which is mounted on the feeder housing by means of flanges 24 secured together by bolts 26. The lower end of shaft 22 is attached to the free end of lever 19 raising or lowering same by adjustment of hand screw 20. As an alternative means for raising and lowering lever 19 an automatic device such as that shown in the following Figure 2, comprising a reversable variable speed motor may be used in conjunction with suitable actuating means as hereinbefore described.

Vertical shaft 16 is supported by shaft collar 28 resting on bushing 29 which is supported by bearing housing 30. Number 31 indicates a chain bushing used to aid in stabilizing the rotation of shaft 16. Bearing housing 30 is attached to and supported by collar 32 which in turn rests on collar 33, the two being separated by an asbestos type gasket (not shown). Collar 33 is attached to the top of vertical cylinder 14. Bellows 34 surrounding the bearing assembly is fastened at each end to collars 36 and 37. Collars 37, 32, and 33 are fastened together by bolts not shown. The bellows are so constructed that they push upwardly on bronze seal ring 38 which contacts clamp ring 39. Bronze seal ring 38 is fastened to collar 36 by bolts 56. Clamp ring 39 is fastened to shaft 16 by friction or other suitable means. In the embodiment shown in the drawing, this is accomplished by using a copper seal ring 40 which is squeezed against the shaft by tightening clamp ring 39 on back up ring 41. As shaft 16 rotates clamp ring 39 rotates against bronze seal ring 38 which is lubricated by a circulating oil system not shown, thus obtaining a gas tight seal. To further prevent gas leakage around the shaft bearing and seal, flue gas is introduced to the space inside the bellows through inlet 42 in seal ring 38. Thus a pressure may be maintained inside the bellows equal to or slightly less or greater, as desired, than that within the feeder housing. A protective metal housing 54 for bellows 34 is fastened to collar 36 only to allow for expansion and contraction of the bellows. Shaft housing 43 is supported by bearing housing 30 at the top and by three braces 44 at the bottom. The top of each of these braces is covered with stellite to prevent excessive wear by pebbles coming in contact with same.

Number 46 indicates a flexible coupling for attaching shaft 16 to shaft 15 which extends downward from and is powered by gears in gear box 47. Number 48 indicates a power means, such as an electric motor, which actuates the gears in box 47 via a suitable belt drive 49. Supports 45 hold up power unit 48 and gear box 47 and are attached to feeder housing 10. Shaft 16 extends downwardly into the bottom of the lower portion of feeder housing 11 and is maintained in axial alignment by bearing 50 which in turn is held in position by four supports 51. The top of each of these supports is also covered with stellite as protection against excessive wear by pebbles. Attached to shaft 16, by means of a removable pin 53, below sleeve 18, is table 52. The height of table 52 in relation to shaft 16 is adjustable by placing said pin through the bottom flange of said table and any one of the holes 55 in shaft 16. By rotating table 52 pebbles are caused to flow over the edge thereof. In this drawing the pebble regulating zone is that area between the bottom of sleeve 18 and table 52.

Figure 2 shows a second embodiment of my invention. In the drawing, numbers 60 and 61 indicate the upper and lower portions of the feeder housing which are fastened together at flanges 62 by bolts 63, said housing being gas tight and pressure resisting. Number 64 is a vertical cylindrical pebble inlet axially positioned with respect to the top portion of the feeder housing and extending downwardly therethrough. Attached to the lower portion 61 of the feeder housing and also axially positioned is a pebble outlet means 65. Attached to outlet 65 by means of flange 67 and bolts 68 is angular conduit 66 which carries the flow of pebbles away from the outlet. Extending upwardly through the bend of conduit 66 and into the feeder housings is rotatable shaft 69 axially positioned with respect to said feeder housings and with respect to pebble inlet 64. Stuffing box 70 is located at the point where shaft 69 extends through conduit 66 and is utilized to maintain a gas-tight seal. Surrounding shaft 69 within the feeder apparatus and extending upwardly from conduit 66 is shaft housing 71 which protects the shaft from wear by pebbles. Shaft 69 extends into the lower portion of pebble inlet 64 where it is maintained in axial alignment and protected by cap bearing 72 which is attached to inlet 64 by means of supports 73. Pebble feeding table 74 is positioned at right angles with respect to shaft 69 and slightly below inlet 64. Vertical support for shaft 69 is supplied by thrust bearing 76. The vertical position of shaft 69 may be adjusted automatically. Motor 77, actuated by suitable means previously described, rotates bevel gear 84 which in turn rotates horizontal bevel gear 85 which is supported by means 86. The inside of gear 85 is threaded in such a manner that it matches the threads on the lower portion of shaft 69. By rotating gear 85 in one direction shaft 69 is pushed upward and by rotating the same gear in the opposite direction the shaft is lowered. By controlling the number of turns of gear 85 the shaft may be lowered or raised as much as desired thereby helping to control the flow of pebbles from table 74. Under some conditions it may be desirable to have an actuating means for motor 77 which only allows the motor to run for predetermined increments of time or for a predetermined number of revolutions, thus making a proportional adjustment. The advantage of this is to allow the effect of a small change to be effective throughout a pebble heater and cooperating reaction zone and to avoid over controlling. Means for rotating shaft 69 is power unit 78, such as an electric motor, supplying power to shaft 79 by means of a belt drive. Attached to shaft 79 is worm 80 which rotates worm gear 81 attached to shaft 69 by key 82. Additional vertical stability is given to shaft 69 by bearing 83.

Means for controlling the apparatus of Figure 2 is somewhat similar to that which may be used for the apparatus of Figure 1. The following is an example of one method which may be used. A gravitometer responsive to the reactor effluent stream or a pyrometer responsive to the temperature of the pebble heating zone, or the temperature of the pebbles, is utilized to control the power means for rotating shaft 69 and table 74. The table may be raised and lowered manually by substituting a hand screw similar to that in Figure 1 for the motor and gears. Other activating means for controlling the pebble feeders of either of these two embodiments may be used such as means responsive to the flow rate of reactant gases, temperature of the flue gas from the pebble heater, and the like.

Figure 3 shows how either of the embodiments of my invention may be incorporated with a pebble heater and a reaction chamber to control the flow of pebbles and thereby the temperature within the reaction zone. Pebbles from elevator 110 pass through conduit 111 and into the top of pebble heater 112 where they are heated by the combustion of fuel gas introduced thereto via line 113. Flue gas which has lost must of its heat by transfer to the pebbles is exhausted via conduit 114. Heated pebbles from the heater pass downward to reaction zone 116 through conduit 117. Steam introduced to conduit 117 via line 118 serves as a seal at this point preventing any gases from heater 112 from passing into the reaction zone, and any fluids from zone 116 from passing upwardly into the heater. Reactant fluids are introduced to reaction zone 116 via line 119 and contact heated pebbles which supply the necessary heat of reaction. Effluent from the reaction zone is removed via line 120. Cooled pebbles, i. e., pebbles which have given up their heat to the reactant fluids, are passed from reaction zone 116 via conduit 121 to pebble feeder unit 122 which in this instance is that shown more completely in Figure 1, except that it is equipped with an automatic control for raising and lowering sleeve 18. Number 123 indicates a second steam seal which prevents the loss of fluid from zone 116 through conduit 121. Temperature differential controller 124 which measures the temperature difference between the inlet of zone 116 and the outlet thereof through lines 126 and 127 respectively may control the speed of power means 128 and thereby vary the flow of pebbles by speeding up or slowing down the speed of feeder 122, and may also control power means 134 and thereby the distance between the sleeve 18 and table 52 of the feeder shown in Figure 1. Additional control means is gravitometer 130 which, in processes where cracking and the like take place, measures the gravity of the effluent gases from zone 116 passing through outlet line 120. Suitable means for controlling power means 128 and 134 are provided and are indicated by dotted lines 131 and 135 respectively for the temperature differential controller and dotted lines 132 and 136 respectively for the gravitometer. Pebbles flowing from feeder 122 are passed through conduit 133 and on to elevator 110.

Although this apparatus has been described in terms of its preferred modifications, it is understood that various changes may be made without departing from the spirit and scope of the disclosure and of the claim.

I claim:

A pebble feeder comprising in combination a chamber having a vertically disposed inlet conduit secured thereto and projecting into the upper portion thereof, an outlet conduit connected in communication with the lower portion of said chamber, an inverted cup shaped bearing disposed centrally in said inlet conduit and secured thereto, said outlet conduit having an opening in the wall thereof and a stuffing box secured to said outlet conduit disposed around said opening, a vertical shaft slidably and rotatably journaled in said bearing and said stuffing box, a horizontally disposed circular table attached to said shaft in said chamber spaced below said inlet conduit and above said stuffing box, a protective sleeve secured to said outlet conduit around said opening and surrounding said shaft extending up into said chamber to a point spaced above said outlet conduit and below said table, means to raise and lower said shaft and table during rotation thereof, and means to rotate said shaft and table.

LOUIS J. WEBER.

References Cited in the file of this patent

UNITED STATES PATENTS

| Number | Name | Date |
|---|---|---|
| 230,525 | Brinton | July 27, 1880 |
| 1,087,478 | Wilson | Feb. 17, 1914 |
| 1,372,765 | Miller | Mar. 29, 1921 |
| 1,743,394 | Rhoades | Jan. 14, 1930 |
| 2,446,805 | Bergstrom | Aug. 10, 1948 |
| 2,447,306 | Bailey et al. | Aug. 17, 1948 |
| 2,468,712 | Kohler | Apr. 26, 1949 |
| 2,520,096 | Harter | Aug. 22, 1950 |
| 2,530,274 | Weber | Nov. 14, 1950 |
| 2,544,575 | Weber | Mar. 6, 1951 |
| 2,544,576 | Weber | Mar. 6, 1951 |